US006212549B1

United States Patent
Page et al.

(10) Patent No.: US 6,212,549 B1
(45) Date of Patent: Apr. 3, 2001

(54) TRACKPOINT-BASED COMPUTER-IMPLEMENTED SYSTEMS AND METHODS FOR FACILITATING COLLABORATIVE PROJECT DEVELOPMENT AND COMMUNICATION

(75) Inventors: John D. Page, Saratoga; Eugene E. Bouchard, Pleasanton; Venkat R. Sriram, Cupertino; Scott E. Stanelle, San Jose, all of CA (US)

(73) Assignee: NexPrise, Inc., Santa Clara, CA (US)

( * ) Notice: Subject to any disclaimer, the term of this patent is extended or adjusted under 35 U.S.C. 154(b) by 0 days.

(21) Appl. No.: 09/164,947

(22) Filed: Oct. 1, 1998

Related U.S. Application Data
(60) Provisional application No. 60/061,198, filed on Oct. 6, 1997, provisional application No. 60/061,129, filed on Oct. 6, 1997, provisional application No. 60/061,299, filed on Oct. 6, 1997, provisional application No. 60/061,214, filed on Oct. 6, 1997, provisional application No. 60/061,552, filed on Oct. 6, 1997, and provisional application No. 60/062,542, filed on Oct. 6, 1997.

(51) Int. Cl.[7] .................................................. G06F 13/00
(52) U.S. Cl. .......................... 709/205; 709/204; 709/313; 709/329
(58) Field of Search ...................................... 709/100, 102, 709/104, 105, 106, 202, 204, 205, 217, 219, 313, 328, 329

(56) References Cited

U.S. PATENT DOCUMENTS

| 5,381,332 | 1/1995 | Wood | 364/401 |
|---|---|---|---|
| 5,548,506 | 8/1996 | Srinivasan | 364/401 |
| 5,583,993 | * 12/1996 | Foster et al. | 709/205 |
| 5,706,452 | 1/1998 | Ivanov | 395/331 |
| 5,862,346 | * 1/1999 | Kley et al. | 709/245 |
| 5,878,214 | * 3/1999 | Gilliam et al. | 709/204 |
| 5,893,906 | * 4/1999 | Daffin et al. | 705/28 |
| 6,044,368 | * 3/2000 | Powers | 707/2 |

\* cited by examiner

*Primary Examiner*—Viet D. Vu
(74) *Attorney, Agent, or Firm*—Beyer Weaver & Thomas, LLP

(57) ABSTRACT

A computer-implemented method for facilitating collaboration and communication among project participants working collaboratively on a project using a computer network. The method includes providing a plurality of trackpoints that are created by at least two of the project participants. Each of the plurality of trackpoints includes metadata descriptive of the each of the plurality of trackpoints. Each of the plurality of trackpoints is configured to store data within its content. The method also includes providing indices of trackpoints based on searchable keys. Additionally, the method includes providing a plurality of tools. The plurality of tools include at least one of a search tool, a notification tool, and a briefing book page, the search tool being configured to search the indices for at least one trackpoint of the plurality of trackpoints that satisfies search criteria, the notification tool being configured to notify a project participant that is authorized to use the notification tool when notification criteria are satisfied, and the briefing book page represents a data presentation mechanism that is configured to receive briefing book data from at least two of the plurality of trackpoints.

5 Claims, 6 Drawing Sheets

504

SUBJECT = "CYLINDER BORE" OR "CYLINDER LINER"

DATE = AFTER OCTOBER 10, 1997

KEYWORDS = "CYLINDER" OR "HONE"

REFERENCED BY = TRACKING POINT 19655 WITH "DEPENDS ON" OR "FUNCTION LINK"

TRACKPOINT-BASED COMPUTER-IMPLEMENTED SYSTEMS AND METHODS FOR FACILITATING COLLABORATIVE PROJECT DEVELOPMENT AND COMMUNICATION

This application claims priority under 35 U.S.C 119 (e) of the U.S. provisional applications listed below, all of which are incorporated by reference herein.

"Object Oriented HTML" filed Oct. 6, 1997 by inventors Eugene E. Bouchard, Varma Kunaparaju, Venkat R. Sriram, and Scott E. Stanelle (U.S. application Ser. No. 60/061,198)

"Keyword Searching" filed Oct. 6, 1997 by inventors Eugene E. Bouchard, Varma Kunaparaju, Venkat R. Sriram, Scott E. Stanelle, and Wallace W. Yau (U.S. application Ser. No. 60/061,129)

"Protocol Packet" filed Oct. 6, 1997 by inventors Eugene E. Bouchard, Varma Kunaparaju, Venkat R. Sriram, and Scott E. Stanelle (U.S. application Ser. No. 60/061,299)

"Overall MECE Design" filed Oct. 6, 1997 by inventor Eugene E. Bouchard (U.S. application Ser. No. 60/061,214)

"Internet Caching" filed Oct. 6, 1997 by inventor Eugene E. Bouchard (U.S. application Ser. No. 60/061,552)

"Link Searching" filed Oct. 6, 1997 by inventor Eugene E. Bouchard (U.S. application Ser. No. 60/062,542)

BACKGROUND OF THE INVENTION

The present invention relates to computer-implemented systems and methods for project management. More particularly, the present invention relates to improved computer-implemented techniques for facilitating collaborative project development and communication among the project participants.

The management of resources (e.g., time, people, materials or the like) and response to changes in the development of a large project has long presented many challenges to the project participants and the managers responsible for bringing the project to completion. Take for example the case of an automobile development project. Automobiles employ engines, which have cylinders that may need to be cast and honed prior to being assembled into the engine. In this very simple example, an automobile company X may engage a supplier Y, who supplies cast cylinders to automobile company X. Automobile company X may also engage a honing contractor Z, who is under contract to receive the cast cylinders from automobile company X and hone them to specification.

To ensure that the engine development portion of the project is on track, a manager in automobile company X may need to track the delivery of cast cylinders (in terms of quality, quantity, delivery date, or the like) from supplier Y. That manager may also need to set up a schedule to ship the cast cylinders received from supplier Y to honing contractor Z for honing. To ensure that the shipment of cast cylinders was not lost after being shipped out to contractor Z, that manager may also need to set up a separate schedule to confirm perhaps a few days after shipping, that honing contractor Z had indeed received the cast cylinders.

Automobile company X may wish to grant supplier Y access to the project management software, or at least to some portion of it, so that supplier Y can tick off its own action item (e.g., shipping a quantity of cast cylinders to automobile company X automobile a certain date). Such access by supplier X is beneficial since an employee in automobile company X may wish to be notified of the shipment in order to ready the quality control group for inspecting the incoming cast cylinders and/or to notify honing contractor Z of the upcoming honing order.

Likewise, automobile company X may also wish to grant honing contractor Z access to the project management software, or at least some portion of it, so that honing contractor Z can receive information pertaining to when and how many of the cast cylinders were actually shipped to him from automobile company X so that contractor Z can more efficiently manage its resources to service the honing order (such as to arrange to rent honing equipment in anticipation of the arrival of the cast cylinders). Such access by honing contractor Z would also benefit automobile company X since honing contractor Z may in turn be able to use the project management software to notify the interested employees within automobile company X of the honing progress, whether and when the honed cylinders were shipped back to automobile company X, and so forth. Honing contractor Z may also want to have the ability to inform to automobile company X, or the employees of automobile company X that are interested in the honing process, that it has perfected a new honing technique and may be able to hone to a closer tolerance if automobile company X can extend the deadline for the delivery of honed cylinders by a few weeks. All these communications are preferably implemented in a single software package to facilitate record keeping and integration with progress tracking.

Communication among the project participants (such as the employees of company X, supplier Y, and honing contractor Z in this example) may be complicated by some real world, practical considerations. For example, automobile company X may prefer, due to confidentiality considerations, that honing contractor Z do not know about the price paid by automobile company X to a competing honing contractor, or to casting supplier Y.

Although the above scenario is discussed in some detail to illustrate some challenges and requirements that may be present when managing a complex project, such a scenario is very simplistic. In the real world, it is not uncommon for a project to require dozens or hundreds of geographically remote participants, each contributing to a portion of the project at various time periods, and many of whom need to work and communicate collaboratively if the project is to be completed timely and efficiently.

In the current art, there exist many types of software programs that may be employed for project management. By way of example, Gantt charts, in either the hardcopy version or the software version, have long been employed by project managers to track tasks and dates relevant to a particular project. To facilitate discussion, FIG. 1 illustrates a Gantt chart 100, including thereon bars representing tasks and deadlines. Although only a few tasks are shown on Gantt chart 100, it should be kept in mind that the example has been vastly simplified to facilitate discussion. In reality, a typical real world Gantt chart may involve thousands or tens of thousands of tasks and may very well fill an entire wall, or even more, if displayed on paper.

On Gantt chart 100, bars 102 and 104 represent the major tasks that need to be undertaken. Bar 102 may represent, for example, the cylinder development phase, and bar 104 may represent, for example, the engine assembly phase. A dependency line 106 connects the end of bar 102 to the beginning of bar 104, signifying the fact that cylinder development has to be completed before engine assembly can begin. A milestone 108 marks the completion of the engine assembly phase.

A major task such as cylinder development may be subdivided into subtasks. Gantt chart 100 tracks these subtasks by the use of subtask bars, such as bars 112 and 114 under cylinder development task bar 102. Bar 112 may represent, for example, the subtask of obtaining cast cylinders, and bar 114 may represent, for example, the subtask of getting the cylinders honed. Subtasks may also have relationships, one of which is illustrated in FIG. 1 by a dependency line 116. Dependency line 116 connects the end of bar 112 to the beginning of bar 114, signifying that cylinder honing can not begin until after the cylinders are casted.

Although Gantt charts, both on paper and in their software versions, have been employed successfully in bringing many projects to completion, there are disadvantages. By way of example, one of the weaknesses of the traditional Gantt chart approach is the inability to allow a project participant to easily filter through the voluminous data related to a project in order to focus in only on data and/or deadlines that are relevant to that particular user in a specified time period. Take for example the case of an employee of automobile company X, who are involved in or interacting with multiple departments (e.g., cylinder development, clutch ordering, paint testing, etc.). The traditional Gantt chart approach does not allow this employee to easily find out, for example, what action items he needs to take on a specified day or a specified week across the multiple departments involved.

A Gantt chart typically deals with only tasks (and subtasks), the task commencement dates, and deadlines. During a project, they are many times when a project participant needs to communicate different types of information, other than tasks and dates, with other project participants. By way of example, a project participant may wish to employ the project management software to communicate to those interested that a new piston design has been selected and also include a drawing of the newly designed piston in the communication. The redesign of the piston may impact those in cylinder design (including our supplier Y and honing contractor Z). However, the typical Gantt chart does not provide a facility to allow project participants interested in or impacted by the piston design change to be alerted of this fact, to view the new piston design, to determine how their own delivery schedule may be impacted, and to communicate their concerns with other project participants (e.g., the manager in charge of engine assembly, who depends on timely delivery of finished components to perform his job). Without these communication facilities, project participants must switch to other communication modalities outside of the project management software environment to communicate, e.g., switch to email, phone, facsimile, or the like. When that happens, it becomes very difficult to centralize record keeping of the communications and/or integrate the communications with progress tracking.

Still further, the typical Gantt chart does not readily provide a way for a project participant to track the actual performance on a particular task (e.g., the number of cylinders actually honed) and compare the actual performance with the expectation in order to generate a notification or an alert. Still further, there are times when an explanation or a comment would be helpful to clarify to other project participants why a data item is modified (such as when the piston design is changed). By way of example, it may very well be the case that the change in piston design was made to allow the use of less expensive and more readily available cylinders that the piston group knew about. Without this annotation capability, however, project participants such as the employees in the cylinder development group may be aware only of the piston design change and may respond by undertaking expensive cylinder design changes unless someone in the piston design group remembers to use another forum of communication (e.g., email, phone, facsimile, or the like) to inform the cylinder design group of the ready availability of the suitable cylinders.

Collaborative Gantt charts also suffer many of the aforementioned disadvantages. By way of example, a typical collaborative Gantt chart also does not readily provide a way for a project participant to filter through vast amount of data in order to focus in on items, data, or dates that are relevant to that particular project participant. Likewise, there is usually no facility with which a project participant can easily ask the typical collaborative Gantt chart software to compare the actual performance versus the expected performance of a trackable item in order to generate a notification or a warning. Typical collaborative Gantt charts also lack the aforementioned annotation capability, making it difficult for project participants to communicate the reasons or explanation behind the data.

Collaborative spreadsheets represent another class of software programs that have been employed to facilitate collaborative project development. In a collaborative spreadsheet, the data pertaining to the items to be tracked are stored in cells, which are arranged in a matrix arrangement and are accessible to the project members. Collaborative spreadsheets, however, also have disadvantages. By way of example, the typical collaborative spreadsheet also does not readily provide a way for a project participant to filter through vast amount of data in order to focus in on items, data, or dates that are relevant to that particular project participant Further, the cell structure is fairly limiting in that each cell typically tracks only one value of one type of data (e.g., text, number, date, and the like). If a trackable event involves multiple values that need to be monitored simultaneously (e.g., both date and quantity), the cell of a typical collaborative spreadsheet does not accommodate such a requirement well.

A typical collaborative spreadsheet cell also lacks the ability to track the change in the cell's value over time. By way of example, the delivery date of the honed cylinders may be revised many times during the project, due to problems encountered by honing contractor Z or due to events outside of his control (such as late receiving of the raw cast cylinders). Unless a history is kept of the change, it would be difficult for the cylinder development manager to go back in time to audit the changes and find out when the date was changed, by whom, and perhaps why. Also, the matrix-like architecture of a typical spreadsheet makes it difficult to partition groups of cells to implement access control.

In view of the foregoing, there are desired improved computer-implemented techniques for facilitating collaborative project development and communication among the project participants during a project.

SUMMARY OF THE INVENTION

In accordance with one aspect of the present invention, there are provided computer-implemented systems and techniques for facilitating collaborative project development and communication among project participants across people, time, and space. In one embodiment of the present invention, there is provided a collaborative project management environment based on computer-implemented constructs known as trackpoints, whose flexible construct permits substantially any type of trackable item or communication to be stored therein. Unlike the single-attribute cell of the prior art collaborative spreadsheet model, a trackpoint can simultaneously track multiple attributes and functions that employ attributes as arguments, can be annotated with multimedia content, and can be represented by metadata (which is descriptive of the trackpoint, its genesis, and/or its evolution) for indexing and searching purposes. A trackpoint can also explicitly or implicitly reference other trackpoints, thereby facilitating the establishment of arbitrary project teams from the common database of trackpoints pertaining to the project.

Using a plurality of tools which take advantage of the architecture of the inventive collaborative project management and communication software, the flexible construct of the trackpoints, the annotation capabilities of the trackpoints, and the indexed metadata, a project participant can author (i.e., create or modify) a trackpoint, can freely and efficiently search for data that is of particular interest to that project participant, can send and/or receive communication through text, drawings, annotations, markups on text/graphics, multimedia content, and other types of data, and can even request to be notified upon the occurrence of certain events. Furthermore, the project participant can advantageously create a customized and/or filtered view that focuses in only on the data relevant to that user, irrespective of whether that data comes from a single trackpoint, from multiple trackpoints, or even multiple trackpoints that are created at different times and by different functional groups of the project.

These and other advantages of the present invention will become apparent upon reading the following detailed descriptions and studying the various drawings.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 depicts an exemplary interest profile, representing a tool that may be provided to the project participant to facilitate data sharing, communication, and collaboration.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to avoid unnecessarily obscuring the present invention.

Figure 1:
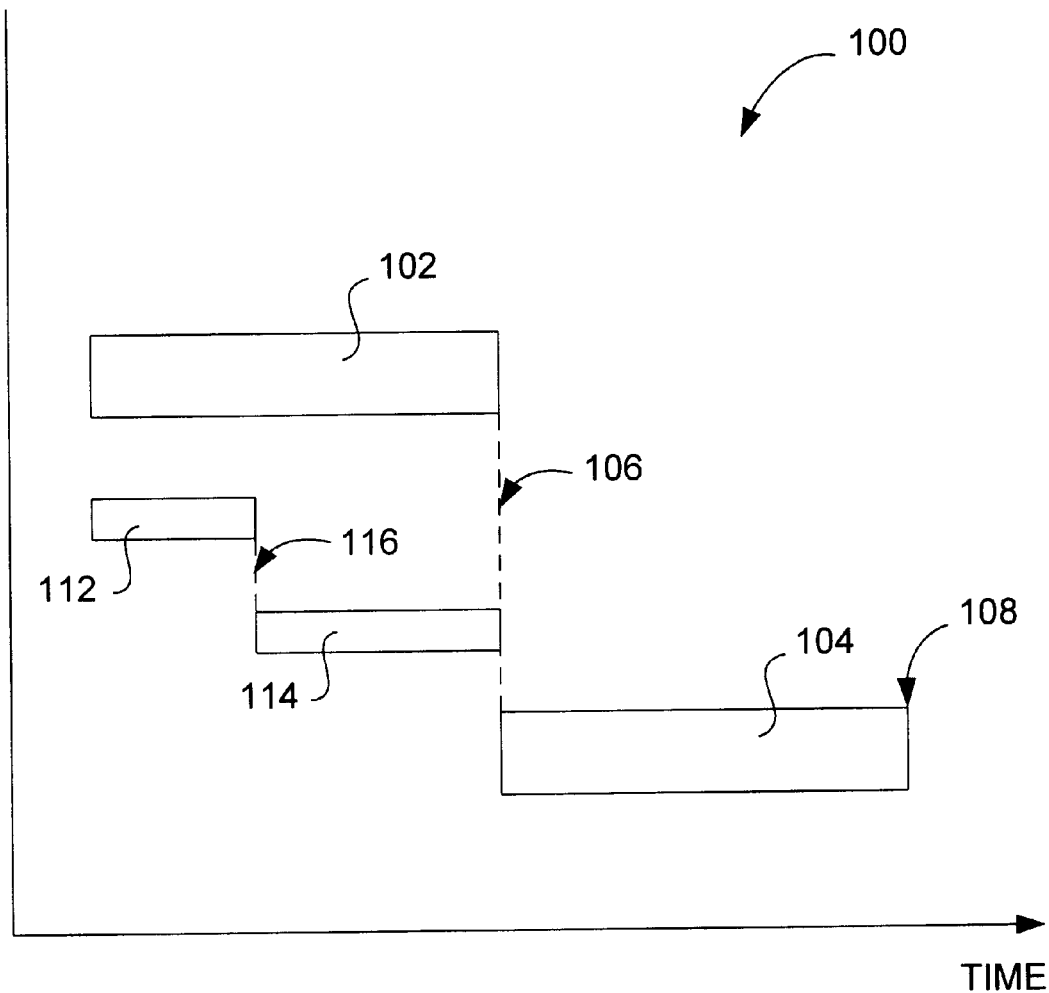
FIG. 1 illustrates a typical Gantt chart to facilitate discussion of some of the challenges that exist in the management of projects.
Figure 2:
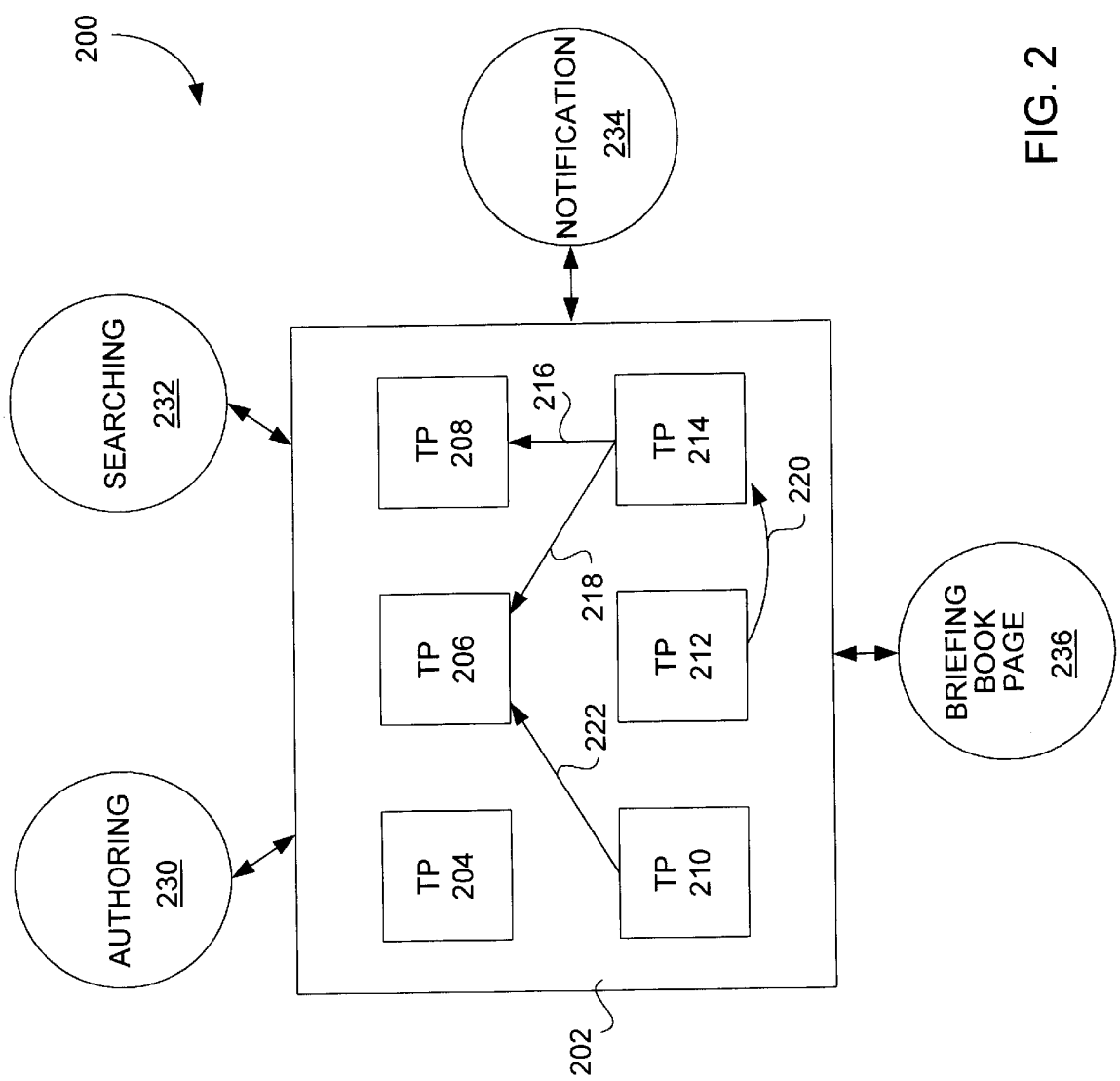
FIG. 2 is a simplified diagram illustrating the architecture of the inventive trackpoint-based collaborative project management and communication software.

To facilitate discussion of the features and advantages of the present invention, FIG. 2 is a simplified diagram illustrating the architecture of the inventive collaborative project management and communication software 200, in accordance with one embodiment of the present invention. In FIG. 2, a trackpoint database 202 represents the database containing the collection of trackpoints pertaining to a particular project. Trackpoint database 202 may be implemented in according with any conventional database technology, and may be implemented in accordance with a relational database methodology. On the other hand, the invention also applies even when trackpoint database 202 is implemented simply as an unstructured collection of trackpoints, managed in files, for example.

Within trackpoint database 202, there are shown trackpoints 204, 206, 208, 210, 212, and 214, representing some of the trackpoints created by the project participants to facilitate tracking events/items pertaining to the project and to communicate with one another. Although only six trackpoints are shown to simplify the discussion, it should be borne in mind that there may be any number of trackpoints in a project. The trackpoints may reference one another, as shown conceptually by exemplary lines 216, 218, 220, and 222. Trackpoint structure and trackpoint referencing will be discussed in detail later herein.

A plurality of tools are provided to enable the project participants to work collaboratively on the project and to communicate using the trackpoints. By way of example, an authoring tool 230 may be provided to allow a project participant to create a new trackpoint or to modify an existing trackpoint. Authoring tool 230 may be implemented in any manner suitable for creating a trackpoint or changing its attributes/links/metadata and for storing that trackpoint in trackpoint database 202. In one embodiment, authoring tool 230 is implemented using object-oriented technology in which the project participant fills in the trackpoint's metadata, selects the links, selects the attribute fields of interest, and fills in the trackpoint's attributes as if he is creating and filling in a form.

A searching tool 232 may also be provided. Searching tool 232 permits a project participant to search through the trackpoints in trackpoint database 202 by specifying a set of search criteria. The search criteria may relate to one or more attributes of the trackpoints, the links that reference trackpoints among themselves, or the metadata that describes a trackpoint. A notification tool 234 permits a project participant to request that he be notified when a certain notification criteria is satisfied. The notification criteria, like the search criteria, may relate to one or more attributes of the trackpoints, the links that reference trackpoints among themselves, or the metadata that describes a trackpoint. Moreover, a project participant can also specify that he be notified upon the creation of a trackpoint whose metadata, links, or attributes satisfy some set of notification criteria since the creation of a trackpoint itself may be an event of interest to a project participant.

A customized filtering and viewing tool, referred herein as a briefing book page, may also be provided. The briefing book page (236) represents, in one embodiment, a custom viewing panel with which a project participant may select and view only the mattributes and data that are of interest to that participant. The attributes and data may be obtained from one or more trackpoints or even from other briefing book pages. By applying data presentation techniques (e.g., graphs, mathematical operations, warning lights, gauges, timelines, or the like), the preselected data may be presented in the format that is most preferred or most appropriate.

The trackpoint-based architecture of the inventive collaborative project development and communication software does not impose any limitation on the tools that may be created and employed by the project participants. The simplicity and flexibility of the architecture illustrated in FIG. 2 allows a project participant to create and/or employ any tool that can take advantage of the rich set of attributes of the trackpoints, the metadata provided with the trackpoints, and the annotation capabilities of the trackpoints in order to facilitate communication, data analysis, and collaboration on the project.

Figure 3:
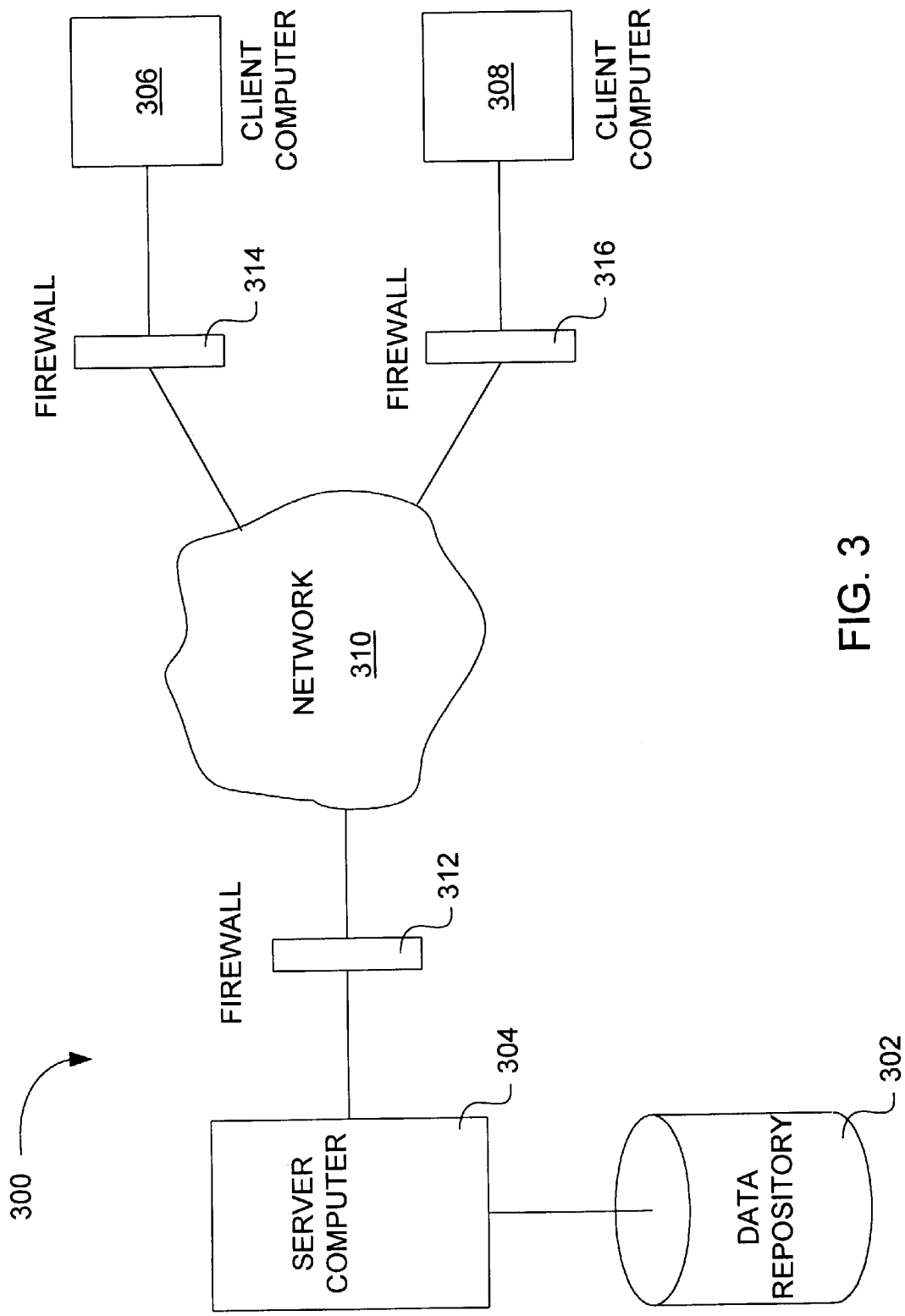
FIG. 3 illustrates an implementation of the inventive trackpoint-based collaborative project development and communication system that involves the internet.

It is contemplated that the inventive collaborative project development and communication system may be implemented on any computer network, including proprietary private networks, virtual private networks (VPNs), or over public networks such as the internet. FIG. 3 illustrates an implementation of the inventive trackpointbased collaborative project development and communication system that involves the internet. With reference to FIG. 3, a collaborative project development and communication system 300 includes a data repository 302, which includes the trackpoint database as well as indexed databases (of any sort, e.g., relational object, file-based, etc.) supportive thereof. The indexed databases implement the indexing of trackpoints using various index keys. In one particularly advantageous embodiment, the various fields of the trackpoint metadata are employed as index keys to create indices. Project participants may search through the indices to identify the trackpoint(s) of interest prior to accessing the trackpoint content.

Data repository 302 is accessed by a server computer 304, whose processor services access, search, data retrieval, data storage, and other requests issued by the project participants through client computers, of which client computers 306 and 308 are shown. The server-client architecture is well known and will not be discussed in great detail here for brevity's sake. Although only two client computers are shown, any number of client computers may be involved, depending on the size of the project.

Between the client computers and server computer 304, there is disposed a computer network 310, which represents the internet in the example of FIG. 3. Since the internet is a public network, a security firewall may be provided between server 304 and computer network 310. A commonly owned co-pending U.S. patent application entitled "Techniques For Improving Index Searches In A Client-Server Environment", filed on even date by Eugene E. Bouchard, and John Page (and incorporated herein by reference) discusses in detail some exemplary techniques for improving the efficiency of index searching in a client-server network. Optional security firewalls 314 and 316 may also be provided to safeguard access to client computers 306 and 308 respectively. Firewalls and their implementations are well known to those skilled in the art and will not be discussed in great details here. Although each of client computers 306 and 308 is shown directly connected to the internet, some client computers may be directly coupled to an internal network, from which internet access and/or access to server 304 is facilitated.

Figure 4:
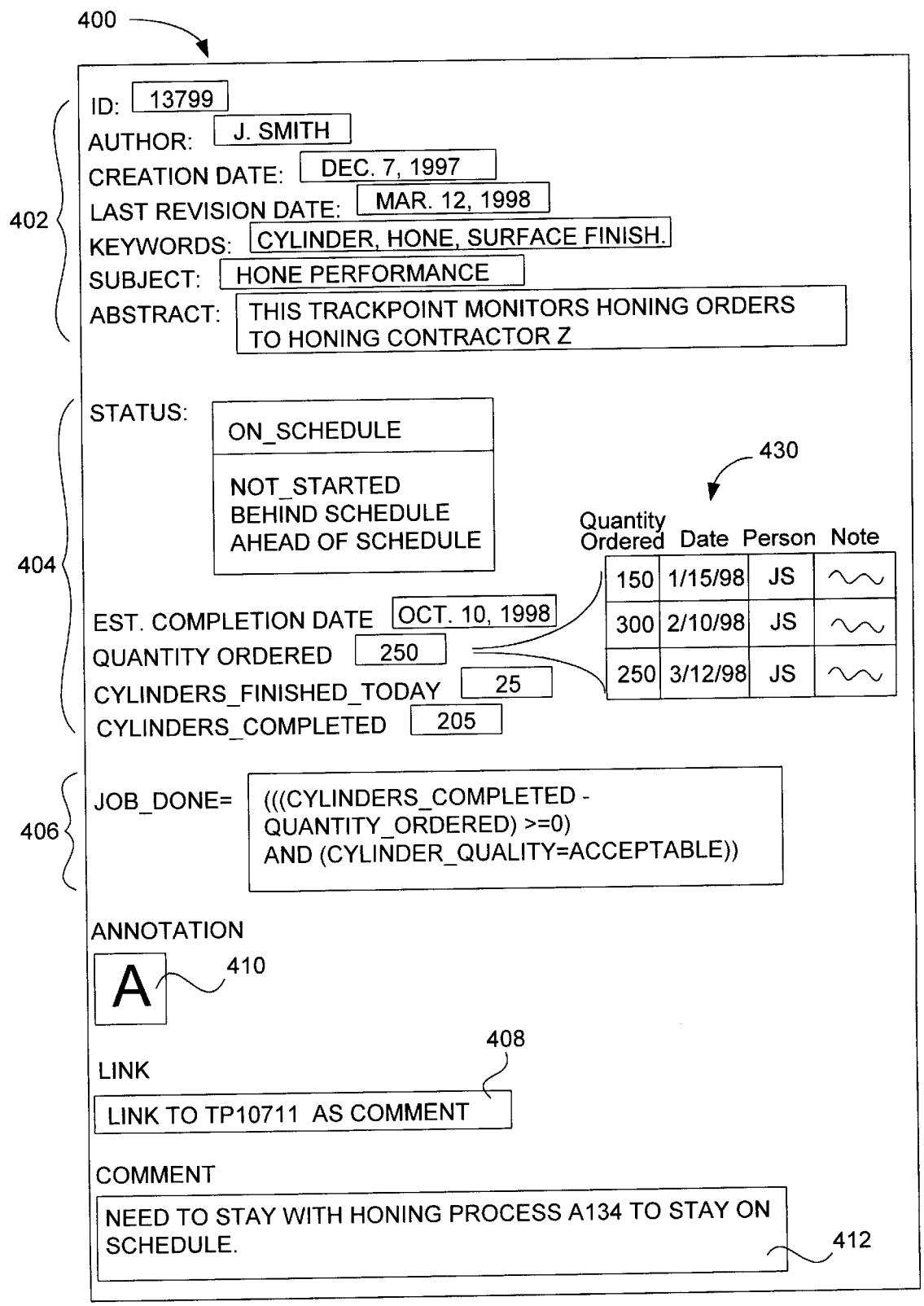
FIG. 4 is a conceptual depiction of the various kinds of components that a trackpoint may have.

FIG. 4 is a conceptual depiction of the various kinds of components that a trackpoint may have. Although many different components are conceptually depicted in FIG. 4 to facilitate discussion, it should be kept in mind that the specific metadata fields, attributes, links, and annotations shown in FIG. 4 are only exemplary and not limiting of the scope of the present invention.

A trackpoint may be represented by metadata, wich describes the trackpoint as a whole. With reference to trackpoint 400 of FIG. 3, the metadata 402 may include, for example, a unique trackpoint ID (which is a unique number assigned by the server computer for the purpose o f uniquely identifying the trackpoint), a uthor, date of trackpoint creation, date of last revision (of any of the components of the trackpoint and/or of the trackpoint definition). The metadata may also include keywords, subject, abstract, and other descriptive and/or bibliographic data pertaining to the trackpoint.

In general, a project participant may search for a trackpoint of interest using many different search techniques. By way of example, a project participant may conduct full searches through the attribute values of all the trackpoints in the trackpoint database to identify the trackpoint(s) of interest. As an example of one such search, the project participant may conduct a search through the content of all trackpoints to identify any trackpoint whose content includes the words "honing contractor Z". Alternatively or additionally, a project participant may conduct searches through the content of all trackpoints to identify trackpoint(s) of interest by their links (e.g., by link type, origination and/or link termination). In accordance with an advantageous aspect of the present invention, the metadata furnishes the project participants with yet another way to search for trackpoint(s) of interest. Using the metadata as search keys, a project participants may, for example, search for trackpoints created by a specific author, trackpoints having some specified keywords or subjects, and/or trackpoints that were revised before or after a certain date. Of course more complex searches may be accomplished using search methodologies that are current state of the art, including the use of Boolean operators and/or employing a natural language searching technology.

To facilitate efficient searching, the metadata may be indexed against the trackpoints in advance by the server. That is, the server com puter may create in advance indices that index particular search keys (e.g., keyword or author) against the identity of the trackpoints. These indices may be updated upon trackpoint creation or upon subsequent trackpoint updates. Thus a project participant may quickly search through the indices to determine, for example, that trackpoints 206 and 212 contain the keyword "piston" without having to undertake a more time-consuming search through the contetnt trackpoints.

The metadata for a particular trackpoint may be entered by the project participant upon trackpoint creation or by user modification or may be automatically updated when the trackpoint is created (or modified). As an example of the latter case, the date of last revision field of the metadata may be automatically entered from the compu ter system's clock when the attribute values, the metadata, and/or the definition of the trackpoint is changed.

Each trackpoint may have any number of attributes 404 to enable it to track the various pieces of information relating to a particular trackable item or trackable event. It is not necessary or even required that two trackpoints have the same attribute set since different trackpoints may be employed to track different kinds of trackable items or events. The attributes of a trackpoint may include, for example, the due date (both expected and actual), status, quantity (both expected and actual), the identity of the person performing the task, and the like. The data type of an attribute may be dates, numbers, boolean, typed data, or any other types of data structures that may be employed to store information.

As one concrete example, a trackpoint set up by the honing contractor for tracking the status of a cylinder honing order may involve an attribute for the status itself (e.g., on schedule, behind_schedule, not_started, ahead_of_ schedule, and the like), an attribute for the number of cylinders expected to be completed by the end of the day, an attribute for the number of cylinders actually finished by the end of the day, and an attribute for the estimated completion date, etc.). As another example, a simple trackpoint may have a single attribute field that is text (e.g., in the case of a trackpoint that is employed to provide explanation for another trackpoint that references it).

The values of the attributes of a trackpoint may be entered manually via user entry, may be derived by the use of a mathematical function (whose arguments may include constants or other attributes within the same trackpoint or within other trackpoints). In the latter case, a project participant may set up a function for sending a notification or warning if certain conditions are met (e.g., if the actual number of cylinders received is smaller than the number of cylinders expected). An exemplary function is shown by reference number 406 in FIG. 4 in which one of arguments of the function (e.g., cylinder_quality) comes from another trackpoint and two of the arguments comes from the same trackpoint. A history of the values of each attribute are maintained to allow examination of trends. The history can be explored manually, or can be used in trigger conditions, for example, to provide a warning only when certain adverse trends are present. An example may be when an anticipated completion date has slipped more than twice.

Further, the value of an attribute may be obtained by the use of a data sensor. A data sensor is a piece of software code attached to an attribute that polls or interrogates other trackpoints or external data stores (irrespective whether the data store poled is associated with the project management software program) to obtain data to fill out the value of that attribute. With reference to the earlier example, the "cylinders_completed_today" attribute value may be automatically updated when a data sensor attached to that attribute polls the production database (e.g., a data store associated with the computer-controlled honing machines) or polls another trackpoint that has been set up to track production specifically . The sensor can be activated periodically or upon the occurrence of a certain triggering activity or event. The triggering activity or event may be, for example, the fact that someone wants to use or view the attribute value associated with the data sensor or any other arbitrarily defined activity or event.

Activator code may also be attached to an attribute field. The activator code may specify, for example, that if the attribute value meets a certain criteria, some predefined action would take place. As a concrete example, activation code may be attached to the "cylinders_completed_today" attribute to allow the value of this attribute to be compared against the value of the "cylinders_expected_to_be_ completed_today" attribute in order in to force or cause a status attribute to change to either "on_schedule" or "behind_schedule".

Security classification is an attribute that provides a mechanism for restricting trackpoint access. In accordance with one aspect of the present invention, individual trackpoints and project participants may be assigned security classifications in order to allow a project manager to limit a particular project participant's access to the pool of trackpoints available in the trackpoint database. By appropriately assigning the security classifications to the trackpoints and project participants, a project participant may be limited only to trackpoints within the assigned security container and will not have access (or typically will not even know) of trackpoints for which authorized access is not granted. With reference to FIG. 4, the security classification attribute of trackpoint 400 is indicated by reference number 412.

The ability to limit access to trackpoints makes it possible for project managers to confidently grant access privilege to project participants who, due to confidentiality concerns, may have been precluded from viewing and/or modifying project management data in the past. With the present invention, each project participant may be assigned a security classification. If a project participant attempts to search for or access trackpoints to which he has no authorized access, those trackpoints (either all or part of their content) will not be returned in the search result and/or that project participant will not have viewing, updating, or referencing privilege relative to the restricted trackpoint(s).

The following concrete example will illustrate the advantages of this security arrangement. If a Gantt chart had been used to track the automobile development project, automobile company X may not wish to grant its outside suppliers and contractors access privilege to its Gantt chart since there would be no way to prevent an outsider (such as supplier Y) from viewing, for example, the delivery schedule of another supplier of cast cylinders. When supplier Y is not included, supplier Y is precluded from make entries, through the project management software, of data which may be useful to other project participants. With the aforementioned security feature in place, supplier Y now can be granted a security classification which allows supplier Y access to only certain trackpoints dealing with cast cylinders ordered from supplier Y, and supplier Y is free to update such trackpoints to inform interested employees of automobile company X of its progress.

In cases where a trackpoint or briefing book page references trackpoints or briefing book pages which the user has no permission, several reasonable policies may be employed according to the preference of the implementator. As an example, one is to verify that all information needed to compute or display a value is available to the user before presenting the value; if it is not, the calculation terminates and simply reports the failure to the user. As another example, the implementator may allow information may be presented since this approach allows a tracking point to be used to summarize and sanitize more private internal information for external consumption. For example, it may be fine to let a honing supplier know the total number of cylinders which are scheduled at any one time, but not provide information about the distribution of those cylinders over a set of casting suppliers.

In accordance with one aspect of the present invention, a history may be kept for some or all attributes of a particular trackpoint. This option may, for example, be specified by the project participant for each attribute field when creating or modifying the trackpoint. A history for the attribute "cylinders_finished_today" is depicted conceptually by table 430 of FIG. 4A. In table 430, the change over time in the value of an attribute may be documented by time-stamping either the old or new attribute value at the time of change, by noting the person changing the attribute value, or the like. If the attribute value is automatically obtained via a data sensor, there may be no person responsible but documenting the change via timestamping is still possible. Optionally, the history of an attribute may include textual explanation of why the value was changed. This textual explanation may be entered by the person causing the change, for example.

By keeping a history of an attribute value through time, the invention makes it possible for a project participant to audit a particular attribute and perhaps spot problems or trends in ways that are not possible in the absence of a historical record. The availability of a historical record that details changes in the attribute's value also gives project participants confidence in the data present in a trackpoint. Without such a historical record, this confidence may be lacking, especially if it is known that many people have access to the attribute under consideration. This is because without an attribute history, a project participant can never be certain whether the value in a trackpoint attribute field is indeed valid (i.e., has not been inadvertently or fraudulently modified by someone having write access to the trackpoint). The attribute history permits a project participant to readily verify the timing of any change, and optionally the identity of the person causing the change, should there be any question.

Trackpoint relationships may be accomplished by the reference mechanism. The relationships between trackpoints may be implicitly or explicitly defined. A trackpoint may be implicitly referenced by another trackpoint if the later trackpoint has a function that employs as an argument an attribute value tracked in the earlier trackpoint. Further, each trackpoint may have one or more links, which are typed data, explicitly specifying its relationship to the other trackpoint being referenced. There is no limit to the number of links that a trackpoint may have. Beside explicitly defining the relationship between trackpoints, links can furnish a search key to allow a project participant to search for trackpoints based on the type of link, the origination or termination of a specified link, or the like.

An exemplary link is illustrated in FIG. 4 by reference number 408. A link may establish, for example, a formal time dependency between two trackpoints whereby a project participant explicitly specifies that the commencement of the task tracked by a given trackpoint depends on the completion of another task tracked by another trackpoint. Another type of formal relationship between trackpoints may be cause-and-effect. Other types of relationships may also be possible. For example, a project participant can link a given trackpoint A to a trackpoint B, which contains textual material that documents or explains some aspect of trackpoint A.

It should be appreciated that referencing via linking and function definition is a powerful and flexible method of relating trackpoints to one another. Trackpoint referencing permits project participants to flexibly and easily establish impromptu working groups, join an existing one for the purpose of receiving or sending communication, or simply take advantage of the data existing in other trackpoints for one's own use. Since a trackpoint can reference to or be referenced by many trackpoints, there is substantially no limit to the flexibility with which the project participants can be organized for the purpose of exchanging information and/or work collaborative on the tasks and subtasks of the projects.

A trackpoint may also offer an annotation capability, which permits multimedia content to be attached to a trackpoint. With reference to FIG. 4, an exemplary annotation button 410 is depicted. By way of example, the specification of the piston may be attached to a trackpoint employed to track piston ordering to provide to the project participant responsible for receiving the pistons a readily accessible way to verify whether the pistons received conform to the specification.

A trackpoint may also be provided with one or more text or graphics areas in which comments, explanations, or other useful information may be posted. One such text area is indicated in FIG. 4 by reference number 412. Through the use of annotation and textual explanations, project participants may communicate with each other in more meaningful ways than merely defining tasks and dates (as in the case with Gantt charts).

As discussed in FIG. 2, a plurality of tools may be provided to allow project participants to take advantage of the trackpoints. By way of example, authoring tools for creating and/or modifying trackpoints have been discussed in connection with FIG. 3 hereinabove. Another tool that may be provided is a notification tool or an interest profile. Through a notification tool, a project participant may request that a notification be received when certain notification criteria are met. By way of example, a project participant may request that a notification be sent to the project participant if the attribute value(s) of a specified trackpoint or groups of specified trackpoints meet some notification criteria Alternatively or additionally, the notification criteria may include a function based on attribute values. Alternatively or additionally, the notification criteria may be based on the values of the metadata or may be link-based, e.g., based on the type of link, the destination or origination of a link. Exemplary notification criteria are depicted in FIG. 5 wherein the project participant may select various notification criteria of interest (502) and filling out their values within an interest profile 504. The notification itself may take any form, including electronic notification through the project management software itself, through email, page, phone, facsimile, or the like.

In accordance with another aspect of the present invention, a project participant may not only specify that the notification be sent when any of the existing trackpoint or trackpoints meet the notification criteria, but may also specify that he be notified upon the creation of a trackpoint that meets the specified notification criteria (since the creation of such a trackpoint itself may represent an event that the project participant may be interested in). By way of example, an engine assembly manager may specify an interest profile (i.e., a notification criteria) that he be notified whenever a trackpoint having to do with engine component is created.

Through the notification tool and trackpoints, a forum for communication among project participants is advantageously established. Any project participant may specify, through an interest profile, to be notified when an event of interest is recorded in one of the trackpoints. Since there is no limit to the type of data that may be stored in a trackpoint, a given project participant may publish information in a trackpoint and be assured that the published information is accessible by project participants who have set up an interest profile to monitor for trackpoints containing such information. Of course, communication may also be accomplished in other ways using the inventive trackpoint-based project management software. By way of example, if a project participant has write privilege to a trackpoint or a briefing book page (the concept of a briefing book page is discussed subsequently herein) that is of interest to others, direct modification of the content of or direct annotation to that trackpoint or briefing book page may also be made. Communication may also be facilitated if the project participant wishing to publish information establish a link between a trackpoint or a briefing book page that he knows will be viewed by others to the trackpoint containing the information to be published. These communication capabilities, which not only allow communication to take place but also permit the communications to be documented in the trackpoints, represent a significant improvement over prior art project management software.

In accordance with one particularly advantageous aspect of the invention, there is provided a customized filtering and viewing tool known as a briefing book page, which allows the project participant to filter through the massive volume of data contained in the trackpoints associated with a project and to generate a view that allows that project participant to quickly focus in only on the data specified to be of interest to that project participant. A briefing book page may be personal to a particular project participant, or may be set up for sharing, with or without access control.

Figure 6:
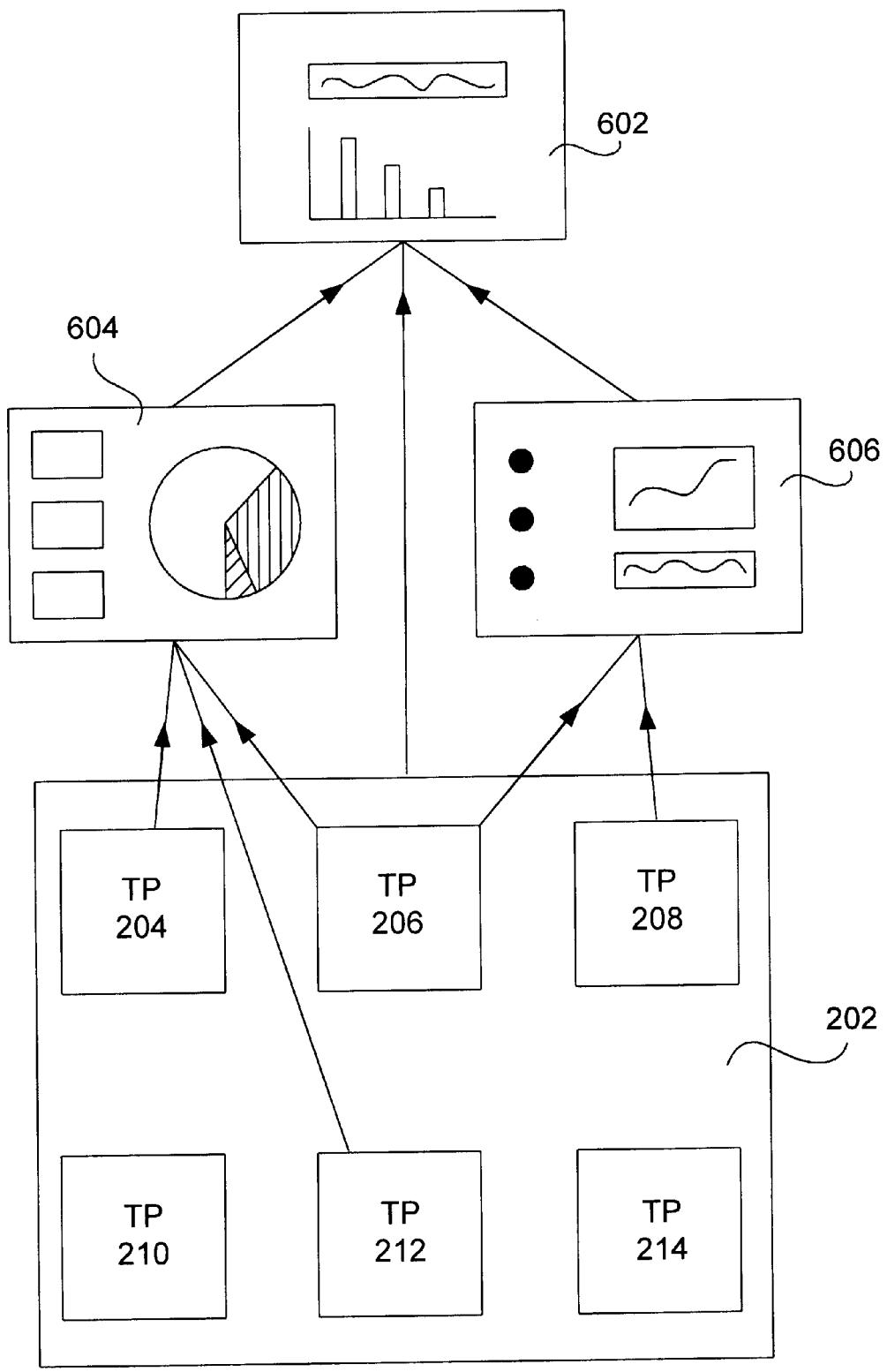
FIG. 6 depicts an exemplary briefing book page, representing another tool that may be provided to the project participant to facilitate data sharing, communication, and collaboration.

With reference to FIG. 6, there are shown briefing book pages 602, 604, and 606, each of which represents a customized viewing panel A briefing book page allows a project participant to filter through the data contained in trackpoints 204–214 within trackpoint database 202 and/or from other briefing book pages to present only data of interest to the project participant in the format preferred. A briefing book page may contain functions that employ trackpoint attributes as their arguments. By way of example, a project participant may create a function to monitor the number of cast cylinders delivered from a supplier and the expected number and generate a warning if the number of cast cylinders received falls short of expectation. As another example, a project participant may wish to plot out the rate of rejection of honed cylinders for various honing contractors (the data for which may come from multiple trackpoints created by quality control personnel) versus the price charged (the data for which may come from other trackpoints created by accounting personnel) in order to select the best price point for getting the cylinders honed. Of course any form of data presentation may be employed (e.g., text, graphs, gauges, warning lights, icons, or the like) to present the selected data or the result derived from the selected data in the format preferred by that project participant.

Briefing book pages may be multilevel. With reference to FIG. 6, briefing book pages 604 and 606 represent briefing book pages that obtain their data directly from the trackpoints whereas briefing book page 602 represents a briefing book page that depends on other briefing book pages for its data. As an example of the latter case, a function or graph in briefing book page 602 may reference the value calculated by a function in briefing book page 604 and/or briefing book page 606. As a concrete example, briefing book page 604 may represent a briefing book page that tracks the overall progress of piston development, briefing book page 606 may represent a briefing book page that tracks the overall progress of cylinder development, and briefing book page 602 may represent a briefing book page that tracks the overall progress of engine development based on the progress of piston development and cylinder development. By creating multi-level briefing books, a properly authorized project participant may be able to take advantage of the work done by others in existing briefing book pages and create an even higher level of data abstraction to help that manager focuses in on the data of interest and analyze it in ways unavailable with the prior art collaborative project management software.

In a particularly advantageous aspect of the present invention, a briefing book page permits a project participant to "drill down" on a particular item on the briefing book page to access the trackpoint(s) and/or briefing book page(s) that underlie the selected item. In the previous example, a project participant monitoring engine development may wish to drill down (e.g., by clicking on a mouse or performing a predefined user input) on the status attribute field in order to, for example, ascertain why the current status for engine development is "behind_schedule". In one embodiment, drilling down on an attribute value or data in a child briefing book page (such as briefing book page 602 in the example of FIG. 6) may bring the viewer to the trackpoint(s) or parent briefing book page(s) (such as briefing book pages 604 and 606 in the example of FIG. 6) from which the attribute value or data under examination is obtained or derived. The identity of the trackpoint(s) or parent briefing book page(s) may be ascertained, for the purpose of drilling down, by following the explicit or implicit link between the child briefing book page and the underlying trackpoint(s) and/or parent briefing book page(s). If desired, the viewer can further drill down on the attribute value of a parent briefing book page (e.g., briefing book page 604) to allow the viewer to follow the link further down to the underlying attributes, which may exist in trackpoint(s) or grandparent briefing book page(s).

It should be appreciated that the ability to drill down on a particular item in a briefing book page is a powerful data analysis tool that is particularly useful to project managers, who must not only be aware of the status but must also grasp the underlying problems in order to devise a solution. Note that although only two levels of briefing book pages are shown to simplify the discussion, there is no limitation to the number of levels. Further, there is no requirement that a briefing book page must obtain data only from its parent briefing book page or from trackpoint(s). If desired, a briefing book page may reference both its parent and grandparent briefing book pages simultaneously, as well as the trackpoint(s) of the trackpoint database.

In one embodiment, a briefing book page or trackpoint may be provided with an "automatic annotation" field. Data in the automatic annotation field is automatically passed up to any briefing book page or trackpoint that references the trackpoint/briefmg book page that contains the automatic annotation field. In this manner, the annotation in a child briefing book page would include all the annotations that exist in the automatic annotation fields of the trackpoint(s)/briefing book page(s) that are parent or grandparent to that child briefing book page. By allowing annotations to accumulate automatically, a project manager may have ready access to comments or explanations provided by other project participants in the underlying trackpoint(s) and/or parent briefing book page(s) without having to drill down.

While this invention has been described in terms of several preferred embodiments, there are alterations, permutations, and equivalents which fall within the scope of this invention. By way of example, although the discussion pertaining to viewing, searching, referencing, briefing book page usage, annotation, and the like do not always explicitly mention the limitations imposed on individual project participants by security classifications, it should be noted that such limitation may exist whenever security classifications are imposed on trackpoints and/or project participants.

Additionally, although only some exemplary tools are discussed, other tools may also be implemented to take advantage of the trackpoint-based architecture of the inventive collaborative project development and communication software as well as of the flexible structure of the trackpoint, briefing book page, or other existing tools. By way of example, a link map tool may be provided which provides the project participant with a map of relationships (established via links or implicitly via functions) between the trackpoints. As another example, a glossary or a taxonomy may be provided to assist the project participant in filling out the attribute values (e.g., the metadata or the typed data within the attribute fields). As a further example, although the invention is discussed in terms of methods and computer networks, it should be understood to also encompass computer-readable medium (such as CDROMs, disks, tapes, or the like) and/or conductive medium and/or networks that contains or carries computer-readable instructions for accomplishing the inventive techniques described and/or suggested. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for facilitating collaboration and communication among project participants working collaboratively on a project, said computer-implemented method being implemented on a computer network, comprising:

providing a plurality of trackpoints, said plurality of trackpoints being created by at least two of said project participants, each of said plurality of trackpoints including metadata descriptive of said each of said plurality of trackpoints, said each of said plurality of trackpoints being configured to store data within its content, wherein said content includes at least one attribute field;

providing indices of trackpoints based on searchable keys;

providing a plurality of tools, said plurality of tools including at least one of a search tool, a notification tool. and a briefing book page, said search tool being configured to search said indices for at least one trackpoint of said plurality of trackpoints that satisfies search criteria, said notification tool being configured to notify a project participant that is authorized to use said notification tool when notification criteria are satisfied, and said briefing book page represents a data presentation mechanism that is configured to receive briefing book data from at least two of said plurality of trackpoints; and linking a trackpoint to another trackpoint.

2. A computer-implemented method for facilitating collaboration and communication among project participants working collaboratively on a project, said computer-implemented method being implemented on a computer network, comprising:

providing a plurality of trackpoints, said plurality of trackpoints being created by at least two of said project participants, each of said plurality of trackpoints including metadata descriptive of said each of said plurality of trackpoints, said each of said plurality of trackpoints being configured to store data within its content, wherein said content includes at least one attribute field;

providing indices of trackpoints based on searchable keys; and providing a plurality of tools, said plurality of tools including at least one of a search tool, a notification tool, and a briefing book page, said search tool being configured to search said indices for at least one trackpoint of said plurality of trackpoints that satisfies search criteria, said notification tool being configured to notify a project participant that is authorized to use said notification tool when notification criteria are satisfied, and said briefing book page represents a data presentation mechanism that is configured to receive briefing book data from at least two of said plurality of trackpoints, wherein said briefing book is further configured to receive briefing book data from other briefing books.

3. The computer-implemented method of claim 2, wherein the step of providing a plurality of tools further provides a drill down tool, said drill down tool being configured to drill down on a selected item in a briefing book to access a briefing book or trackpoint from which the selected item originated.

4. The computer-implemented method of claim 2, wherein the step of providing a plurality of tools further provides an automatic annotation field, wherein said automatic annotation field automatically passes up to any trackpoint or briefing book that references a trackpoint or briefing book containing the automatic annotation field.

5. A computer-implemented method for facilitating collaboration and communication among project participants working collaboratively on a project, said computer-implemented method being implemented on a computer network, comprising:

providing a plurality of trackpoints, said plurality of trackpoints being created by at least two of said project participants, each of said plurality of trackpoints including metadata descriptive of said each of said plurality of trackpoints, said each of said plurality of trackpoints being configured to store data within its content;

providing indices of trackpoints based on searchable keys; and providing a plurality of tools, said plurality of tools including at least one of a search tool, a notification tool, and a briefing book page, said search tool being configured to search said indices for at least one trackpoint of said plurality of trackpoints that satisfies search criteria, said notification tool being configured to notify a project participant that is authorized to use said notification tool when notification criteria are satisfied, and said briefing book page represents a data presentation mechanism that is configured to receive briefing book data from at least two of said plurality of trackpoints, wherein the briefing book page is a tool that further provides a mechanism that plots data from a plurality of trackpoints.

* * * * *

UNITED STATES PATENT AND TRADEMARK OFFICE
CERTIFICATE OF CORRECTION

PATENT NO. : 6,212,549 B1
DATED : April 3, 2001
INVENTOR(S) : Page et al.

Page 1 of 1

It is certified that error appears in the above-identified patent and that said Letters Patent is hereby corrected as shown below:

Column 1,
Line 64, "X automobile" should read -- X on --.

Column 4,
Line 33, after participant insert -- . --.

Column 7,
Line 1, "mattributes" should read -- attributes --.

Column 8,
Line 6, "wich" should read -- which --.
Line 42, "com puter" should read -- computer --.
Line 56, "compu ter" should read -- computer --.

Column 9,
Line 62, "in order in" should read -- in order --.

Column 13,
Line 45, "multilevel" should read -- multi-level --.

Column 14,
Line 44, "trackpoint/briefmg" should read -- trackpoint/briefing --.

Column 15, claim 1,
Line 39, after "tool" change "." to -- , --.

Signed and Sealed this

Twenty-second Day of January, 2002

Attest:

JAMES E. ROGAN
*Attesting Officer*  *Director of the United States Patent and Trademark Office*